United States Patent [19]
Trautwein

[11] 3,779,326
[45] Dec. 18, 1973

[54] SNOW VEHICLES
[76] Inventor: Wolfgang Trautwein, 3529 Carroll Circle S.E., Huntsville, Ala. 30331
[22] Filed: Oct. 4, 1971
[21] Appl. No.: 186,026

[52] U.S. Cl. .................................. 180/5 R, 180/3
[51] Int. Cl. ........................................ B62m 27/02
[58] Field of Search ........................ 180/3, 5 R, 16

[56] References Cited
UNITED STATES PATENTS
2,749,189  6/1958  France ................................ 180/5 R
3,023,824  3/1962  Bombardier ....................... 180/5 R
3,504,752  4/1970  Milward ............................. 180/5 R
3,530,950  9/1970  Lamb .................................. 180/5 R
3,550,707  12/1970 Lange ................................. 180/5 R
3,583,507  6/1971  Trautwein .......................... 180/5 R Primary Examiner—Leo Friaglia
Assistant Examiner—Vincent Hom
Attorney—C. A. Phillips

[57] ABSTRACT

A powered snow vehicle in which a frame portion upon which passengers are seated and a front ski are tiltable with respect to rear, snow engaging tracks, or skis, and with respect to terrain.

7 Claims, 5 Drawing Figures

PATENTED DEC 18 1973　　　　　　　　　　　　　　　　3,779,326
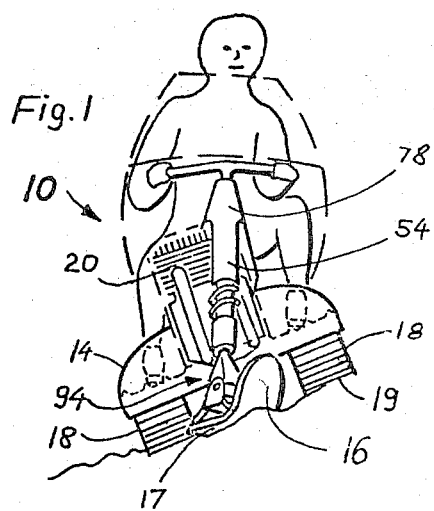
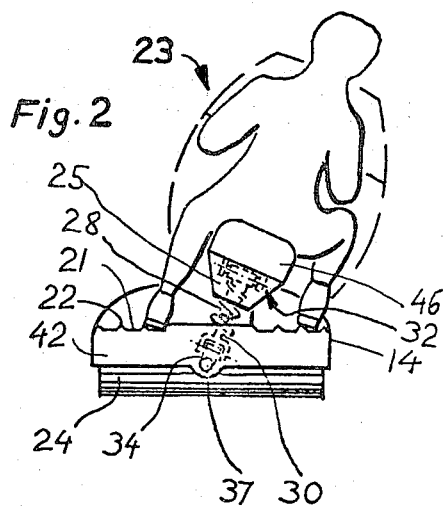
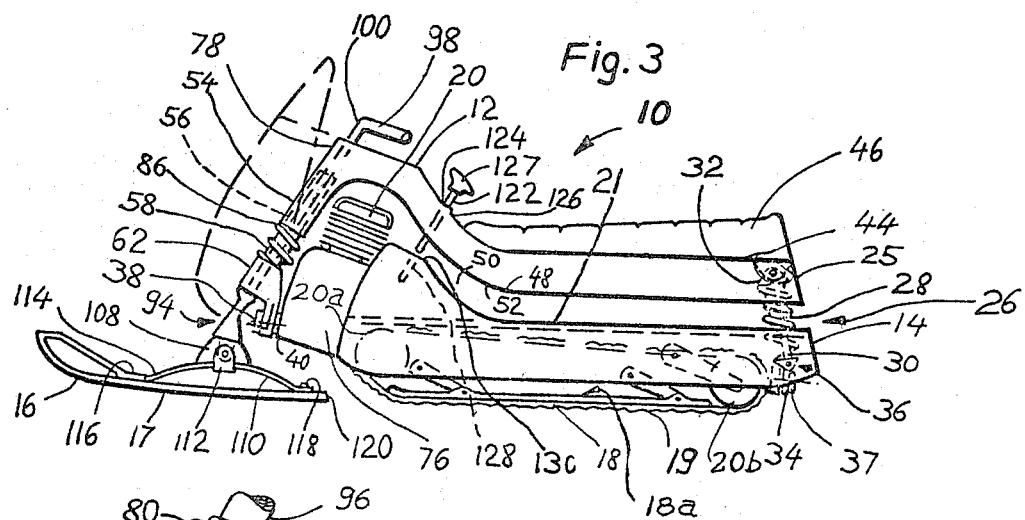
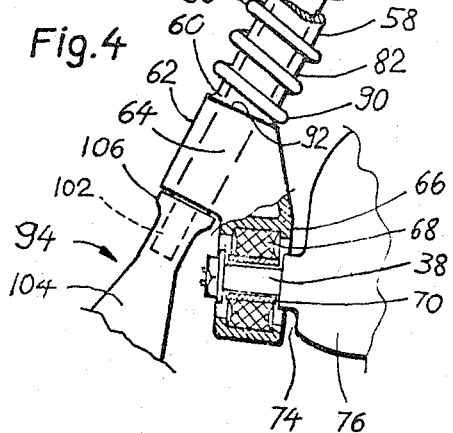
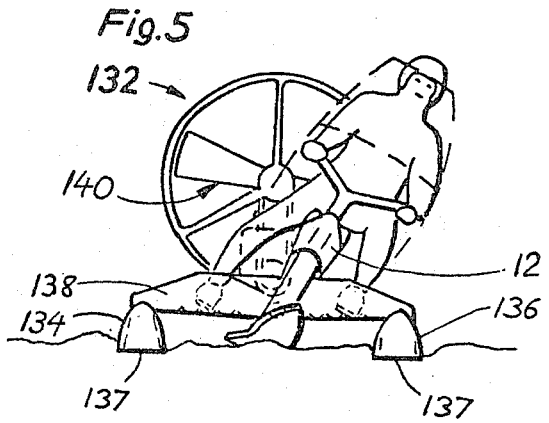

SNOW VEHICLES

BACKGROUND OF THE IN INVENTION

This invention relates to powered snow vehicles popularly referred to as snowmobiles.

GENERAL DESCRIPTION OF THE PRIOR ART

Heretofore snowmobiles (snow vehicles) have lacked maneuverability because of the difficulty, or inability, to shift loading to one side, or banking, when making a turn. In Applicant's U.S. Pat. No. 3,583,507 the problem is overcome with respect to certain vehicles wherein a pair of spaced skis are interconnected to the main body of the snowmobile by means of a parallelogram.

SUMMARY OF THE INVENTION

It is an object of this invention to provide an improved snowmobile wherein banking is enabled without the necessity of connecting outboard skis by means of a parallelogram and which skis tilted as the vehicle was banked.

It is another object of this invention to provide a snowmobile that is simpler and of less expensive construction.

In accordance with the invention a snowmobile is constructed of three principal assemblies, a body member for supporting at least one rider, a rear snow engaging assembly consisting of a propulsion unit and widely spaced lateral support, and a front snow engaging assembly typically in the form of a ski attached through steering means to the main body member. The main body member is mounted to the rear snow engaging assembly to permit pivotal movement about an axis generally parallel to the longitudinal axis of the snowmobile. A reference platform in the form of foot supports is attached on opposite sides of the rear snow engaging assembly to enable the rider to apply a differential force between the main body member and the rear snow engaging assembly to achieve banking or other desired attitudes with respect to terrain and independent of the slope of the terrain.

BRIEF DESCRIPTION OF THE DRAWINGS

The invention will be more fully understood by the following description when taken together with the drawings in which:

FIG. 1 is a front view of a snow vehicle constructed in accordance with Applicant's invention.

FIG. 2 is a rear view of a snow vehicle as shown in FIG. 1 except that drive of the snow vehicle is by means of a single track rather than two tracks as shown in FIG. 1.

FIG. 3 is a side elevation of the snow vehicle.

FIG. 4 is a detail of the front pivotal suspension of the main body of the snow vehicle.

FIG. 5 is a front view of an alternate embodiment of a vehicle as contemplated by Applicant's invention.

DESCRIPTION OF THE PREFERRED EMBODIMENT

Referring to the drawings, and particularly to FIGS. 1, 3, and 4, snowmobile 10 consists basically of an elongated main frame assembly 12, rear drive unit 14 and front support ski 16 having essentially planar bottom surface 17. Rear drive unit 14 includes spaced tracks 18 having essentially planar but grooved bottom surfaces 19, driven by a conventional engine 20 and provided with upper platform 21 which is equipped with spaced longitudinal ridges 22, configured to provide foot rests for the rider. Engine 20 drives tracks 18 through a front sprocket assembly 20a (not shown in detail) and tracks 18 are supported at the rear by rear sprocket assembly 20b (not shown in detail). An even distribution of loading on tracks 18 is achieved through suspension members 18a which are mounted on and spring biased with respect to frame assembly 12 to provide a downward force upon tracks 18.

Snowmobile 23 shown in FIG. 2 differs only in that a single drive track 24 of sufficient width for stability is employed rather than two smaller width spaced tracks. In each instance the front support, ski 16 as shown, would be an elongated member which would have a side edge to side edge width of substantially less than the side edge to side edge width of the rear support.

Main frame 12 is supported near rear end 25 by coil spring suspension and damper assembly 26, having inner spring retaining and damper members 28 and 30 which are slidably engaged, and the upper member 28 which is attached to main frame 12 by clevis arrangement 32. Lower member 30 is coupled in a like manner to rear mounting bracket 34 by clevis assembly 36. Rear mounting bracket 34 is pivotally supported by threaded stud 37, axially aligned with a like stud 38 at front end 40 of drive unit 14 and centrally secured to rear cross member 42.

Main frame 12 extends forward and is spaced above drive unit 14 providing a substantially flat upper area 44 to which multiple passenger seat 46 is attached. At a point 48 near front end 40 of drive unit 14, main frame 12 is configured upwardly to provide clearance space 50 between lower surface 52 of frame 12 and drive unit 14. At point 78, further forward, frame 12 is formed into downward projecting tubular support member 54 having inner surface 56 dimensioned to slidably engage tubular steering column 58, the lower end 60 of which is securely attached to cylindrical portion 62 of front mounting bracket 64. Downward projecting portion 66 of mounting bracket 64 is adapted to accept shock absorbing insert 68 provided with inner bearing 70 pivotally supported by threaded stud 38. Threaded stud 38 is attached to lower front portion 74 of motor housing 76 and is in axial alignment with rear supporting stud 37.

The front end 78 of main frame 12 is suspended by coil spring 80, retained by lower portion 82 of steering column 58. The upper end 86 is configured to contact lower surface 88 of tubular support member 54, and lower end 90 is supported by upper surface 92 of mounting bracket 64. Steering assembly 94 includes steering rod 96 journaled within steering column 58 and fitted with handle bars 98 at upper end 100. Lower end 102 of steering rod 96 is coupled to mounting shoe 104 having enlarged upper support collar 106. The latter is provided with a lower flared portion 108 attached to flexible mount 110, by "U" shaped clamp 112. Front portion 114 of flexible mount 110 is secured to steering ski 16 by mounting socket 116 and is held firmly in place by threaded cap screws 118 near rear end 120.

Flexible flared portion 108 prevents ski 16 from tipping excessively while yet allowing ski 16 to follow contour of the terrain. Locking pin 122 is inserted through an opening 124 in main frame 12 at an appropriate point 126 in front of seat 46. It is provided with knob 127 so that, while restrained by a friction device, not shown, it may be pushed inward to engage socket 128 provided in upper portion 130 of drive unit 14, thus locking main frame 12 in a stable lateral position with respect to drive unit 14.

Still another alternate embodiment is shown as snowmobile 132 in FIG. 5 wherein a pair of laterally spaced skis 134 and 136 having essentially planar bottom surfaces 137 are coupled to platform 138 through vertically acting spring suspension assemblies, not shown. Provision is made for attaching main frame 12 to platform 138 by means of appropriate studs, in like manner to that shown in snowmobile 10. Propulsion power for snowmobile 132 is derived from a motor driven ducted air propeller assembly 140 mounted to the rear of platform 138.

In operation, an occupant takes a position on seat 46 and places his feet on either side of platform 21 while grasping handlebars 98. As the snowmobile is operated on level terrain and while not executing any turns, seat 46 is most comfortable when ridden in a substantially level position. As the vehicle enters a turn, occupant leans in direction of turn, as shown in FIGS. 2 and 5, so that the resultant of gravitational and centrifugal force pushes his body down toward seat 46, as also steering ski 16 tilts laterally to dig into surface. On rough or hilly terrain, occupant can lean uphill as shown in FIG. 1 in order to adjust his center of gravity to a position most favorable for negotiating the terrain.

The banking capability and additional spring suspension of the vehicle main frame member 12, in conjunction with front steering assembly 94 provide, in a simple design configuration, maneuverability, riding comfort, and control superior to that which can be obtained with more conventional vehicles.

What is claimed is:
1. A snow vehicle comprising:
  a main body member for supporting at least one rider;
  first snow engaging means comprising a substantially planar lower surface for supporting said snow vehicle by planar engagement with terrain;
  propulsion means supported on said first snow engaging means for driving said snow vehicle;
  second snow engaging means including a substantially planar, elongated, lower surface for supporting a portion of the weight of said main body member, the total width of said lower planar surface being substantially less than the side edge to side edge width of said lower planar surface of said first snow engaging means;
  pivotal mounting means for supporting said main body member on said first snow engaging means for pivotal movement about a pivotally interconnected axis generally parallel to the longitudinal axis of said snow vehicle;
  steering means mounted on said main body member and including means interconnecting said second snow engaging means to said main body member for rotating said second snow engaging means about a substantially vertical axis and about said pivotally interconnected axis;
  control means comprising a reference platform including first and second foot engaging surfaces supported by said first snow engaging means on opposite sides of said main body member and including means for supporting and maintaining said main body member and said lower surface of said second snow engaging means at a desired inclination with respect to said lower surface of said first snow engaging means and the terrain under the snow vehicle,
  whereby a rider mounted on said main body member may apply a differential force to said first and second foot engaging surfaces with respect to said main body member and causes said main body member, said steering means and said second snow engaging means to tilt with respect to said first snow engaging means and terrain.

2. A snow vehicle as set forth in claim 1 wherein said first snow engaging means comprises a single, continuously movable, wide track driven by said propulsion means.

3. A snow vehicle as set forth in claim 1 wherein said first snow engaging means comprises a pair of laterally spaced skis, said second snow engaging means comprises a single ski and said propulsion means comprises an air propeller drive unit.

4. A snow vehicle as set forth in claim 1 wherein said main body member comprises at least one elastic member for completely constraining up and down and pitching motion of said main body member with respect to said snow engaging means.

5. A snow vehicle as set forth in claim 1 further comprising locking means for selectively interlocking said main body member and said first snow engaging means wherein said pivotal movement of said main body member about an axis generally parallel to the longitudinal vehicle axis is prevented.

6. A snow vehicle as set forth in claim 1 wherein said first snow engaging means comprises a continuously movable pair of laterally spaced tracks driven by said propulsion means.

7. A snow vehicle as set forth in claim 6 wherein said second snow engaging means comprises a single ski.

* * * * *